(12) United States Patent
Palma et al.

(10) Patent No.: US 7,474,069 B2
(45) Date of Patent: Jan. 6, 2009

(54) CIRCUIT FOR USING THE SIGN TRANSITIONS OF A MOTOR PHASE AND A MOTOR PHASE BACK EMF CURRENTS TO CONTROL PWM

(75) Inventors: Marco Palma, Leini' (IT); Massimo Grasso, Trivolzio (IT)

(73) Assignee: International Rectifier Corporation, El Segundo, CA (US)

( * ) Notice: Subject to any disclaimer, the term of this patent is extended or adjusted under 35 U.S.C. 154(b) by 97 days.

(21) Appl. No.: 11/692,395

(22) Filed: Mar. 28, 2007

(65) Prior Publication Data

US 2007/0285047 A1   Dec. 13, 2007

Related U.S. Application Data

(60) Provisional application No. 60/788,688, filed on Apr. 3, 2006.

(51) Int. Cl.
   *H02P 7/00* (2006.01)
(52) U.S. Cl. .................. 318/432; 318/434; 318/811
(58) Field of Classification Search .............. 318/432, 318/434, 811, 599, 459, 500
   See application file for complete search history.

(56) References Cited

U.S. PATENT DOCUMENTS 5,140,248 A   8/1992   Rowan et al.
5,747,955 A * 5/1998   Rotunda et al. ............ 318/434
6,166,928 A * 12/2000  Chandorkar ................ 363/34
6,479,971 B1 * 11/2002 Schrodl ...................... 322/32

* cited by examiner

*Primary Examiner*—Rina I Duda
(74) *Attorney, Agent, or Firm*—Ostrolenk, Faber, Gerb & Soffen, LLP

(57) ABSTRACT

A circuit for optimizing power transferred from an inverter circuit to a motor, the circuit using an open loop method to start-up the motor and have it reach a minimum speed, each phase of the motor receiving voltage from the inverter circuit. The circuit including at least one phase detector circuit for sensing the sign of one or more currents, the sign of the current being used to detect a zero crossing of the current; an interpolator for receiving a voltage reference and outputting a frequency reference and a phase shift reference, the phase shift reference being a difference between an imposed voltage modulation and the one or more currents; and a regulator circuit for using an error between the phase shift reference and the sign of the one or more currents to calculate a phase shift compensation, wherein the sign of the one or more currents is determined to be positive at first sign transition instances when a sinusoidal wave of the current crosses to a positive area and to be negative at second sign transition instances when a sinusoidal wave of the current crosses to a negative area, the first and second sign transition instances being used to detect a phase shift of the current versus the imposed voltage modulation.

10 Claims, 6 Drawing Sheets

CIRCUIT FOR USING THE SIGN TRANSITIONS OF A MOTOR PHASE AND A MOTOR PHASE BACK EMF CURRENTS TO CONTROL PWM

CROSS-REFERENCE TO RELATED APPLICATION

This application is based on and claims priority to U.S. Provisional Patent Application Ser. No. 60/788,688, filed on Apr. 3, 2006 and entitled CURRENT SENSE PHASE COMPARATOR, the entire contents of which are hereby incorporated by reference herein.

BACKGROUND OF THE INVENTION

The present invention relates to controlling PWM, and more particularly to using the sign transitions of a motor phase and a motor phase back EMF currents to control PWM.

SUMMARY OF THE INVENTION

It is an object of the present invention to provide a system and a method to determine the sign of a current when a sinusoidal wave of the current crosses zero, and using sign transitions (of the zero crossing) to detect a phase shift of the current versus the imposed voltage modulation.

A circuit for optimizing power transferred from an inverter circuit to a motor, the circuit using an open loop method to start-up the motor and have it reach a minimum speed, each phase of the motor receiving voltage from the inverter circuit. The circuit including at least one phase detector circuit for sensing the sign of one or more currents, the sign of the current being used to detect a zero crossing of the current; an interpolator for receiving a voltage reference and outputting a frequency reference and a phase shift reference, the phase shift reference being a difference between an imposed voltage modulation and the one or more currents; and a regulator circuit for using an error between the phase shift reference and the sign of the one or more currents to calculate a phase shift compensation, wherein the sign of the one or more currents is determined to be positive at first sign transition instances when a sinusoidal wave of the current crosses to a positive area and to be negative at second sign transition instances when a sinusoidal wave of the current crosses to a negative area, the first and second sign transition instances being used to detect a phase shift of the current versus the imposed voltage modulation.

Other features and advantages of the present invention will become apparent from the following description of the invention that refers to the accompanying drawings.

DETAILED DESCRIPTION OF EMBODIMENTS OF THE INVENTION

Figure 1:
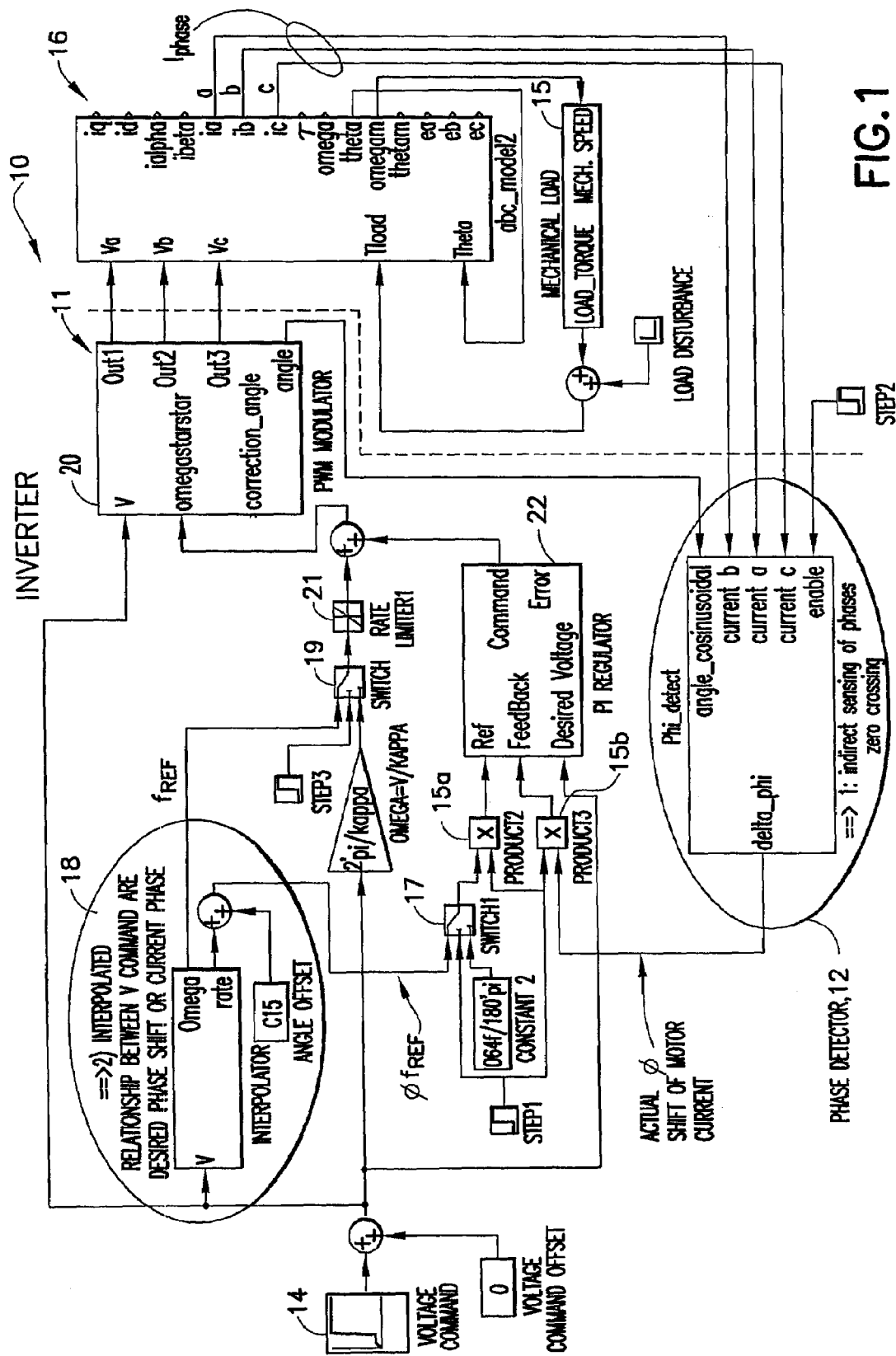
FIG. 1 is a diagram of a circuit of an embodiment of the present invention that optimizing a power transferred from an inverter circuit to a motor using the sign of the current of the motor's phases.

FIG. 1 illustrates a circuit 10 for optimizing a power transferred from an inverter circuit 11 to a motor 16 having a load 15. The inverter circuit 11 includes a phase detector circuit 12 for sensing the sign of a current of each motor phase for controlling the motor 16, which is a Brushless Permanent Magnet Motor receiving voltage $V_A$, $V_B$, and $V_C$ from the inverter circuit for each of the phases.

A voltage reference command 14 is provided to the inverter circuit 11 from outside of the circuit 10 to start the motor 16. An open loop method is used to start-up the motor 16 and have it reach a minimum speed. The sign of the current of the motor's phases $I_{PHASE}$ can be detected by the phase detector circuit 12.

Figure 2:
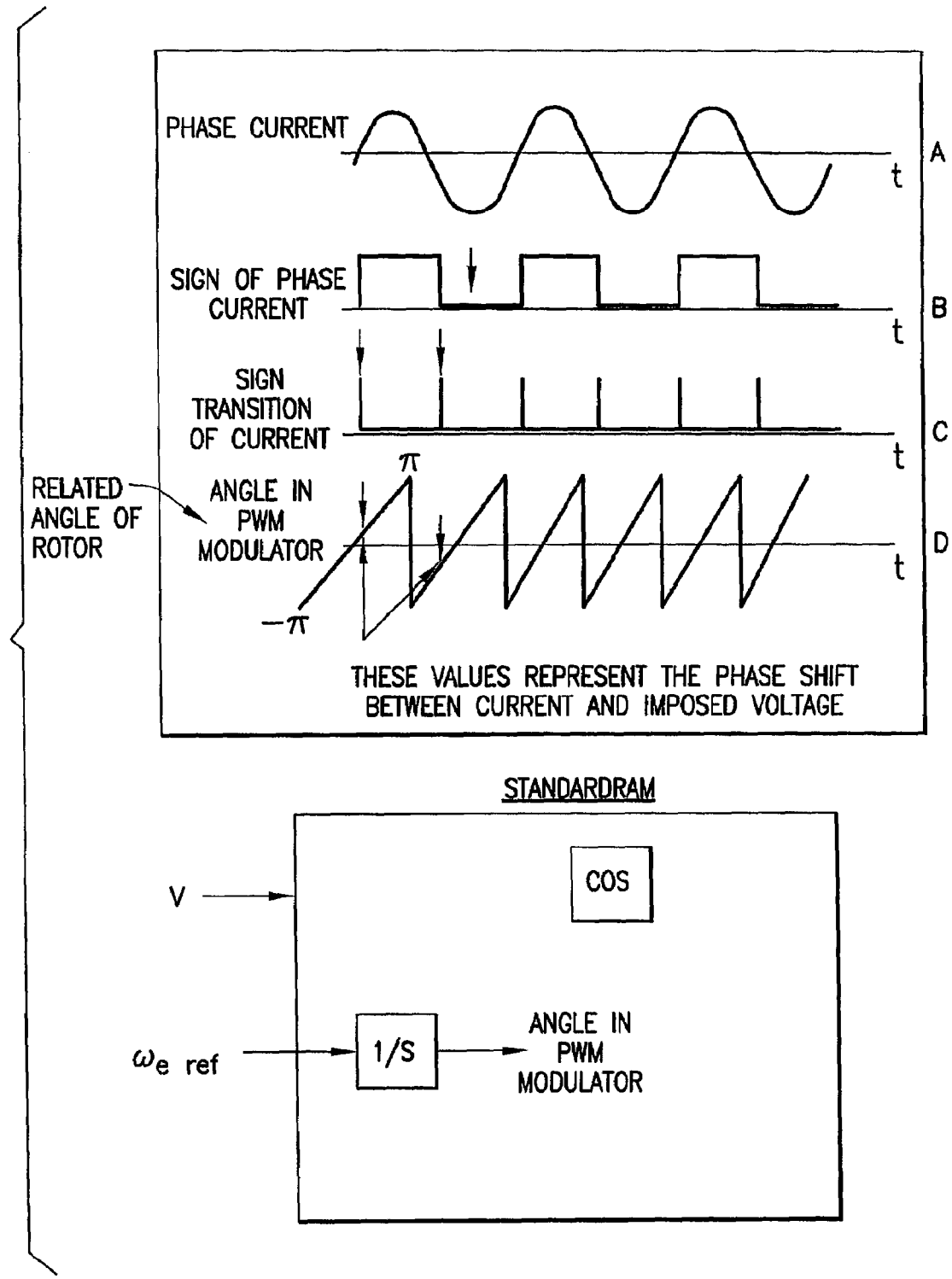
FIG. 2 is a graph of a sinusoidal wave of a phase current, the sign of the current relative to the sinusoidal wave, the sign transition of the current relative to the sinusoidal wave, and the sign transition of the current relative to the imposed voltage modulation.

The sign of the phase currents is used to detect a zero crossing of the current for each phase of the motor 16. As illustrated in FIG. 2, the phase current in graph A is analyzed over a time period t to detect the crossing of the sinusoidal wave from the positive to the negative positions and vice-versa. The sign is thus determined, in graph B, to be positive or High when the phase current is in a positive territory and negative or Low when the phase current is in a negative territory. The sign transition instances or zero crossing of the phase current, in graph C, are then used to detect the phase shift of the current versus the imposed voltage modulation, as in graph D. The phase shift is defined as a difference between the imposed phase voltage modulation and detected phase of each phase current.

Figure 3:
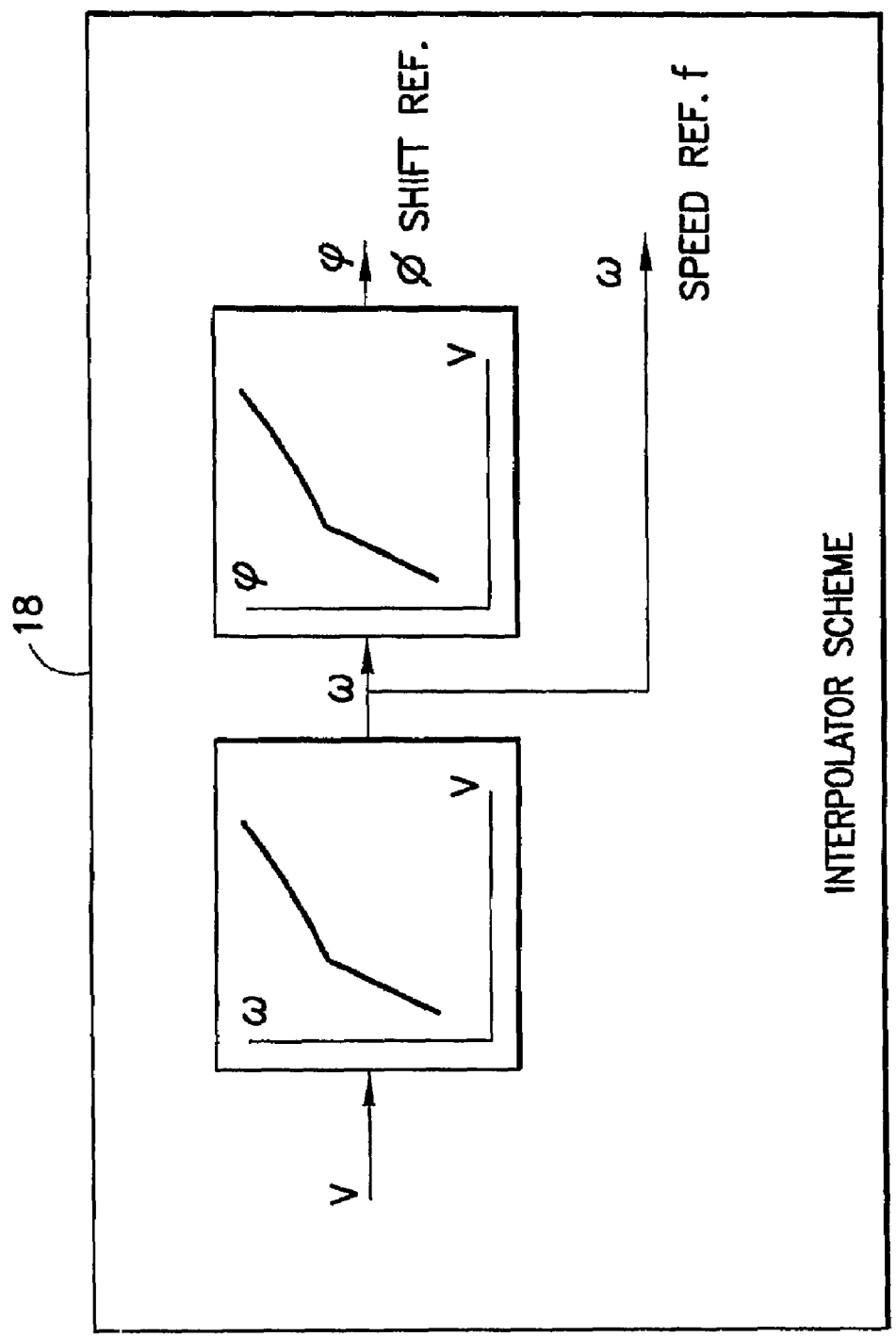
FIG. 3 is a diagram showing operation of an interpolator of FIG. 1.

Reference back to FIG. 1, the loop is closed using an interpolator 18 whose operation is illustrated in FIG. 3. The interpolator 18 receives voltage V and outputs or provides references of frequency or speed ω and a phase shift φ between the imposed voltage modulation and the detected phase currents for regime condition at every speed value.

The speed reference ω is provided to a switch 19 that is controlled by the voltage reference command 14, through a rate limiter 21 to a PWM modulator 20. The phase shift reference φ is provided through a switch 17 to a multiplier 15a and then to a regulator circuit 22. The regulator circuit 22 uses the error between a desired phase shift, provided by the interpolator 18, and a measured phase shift provided by the phase detector circuit 12 through a multiplier 15b to change frequency of the modulator 20.

Figure 4:
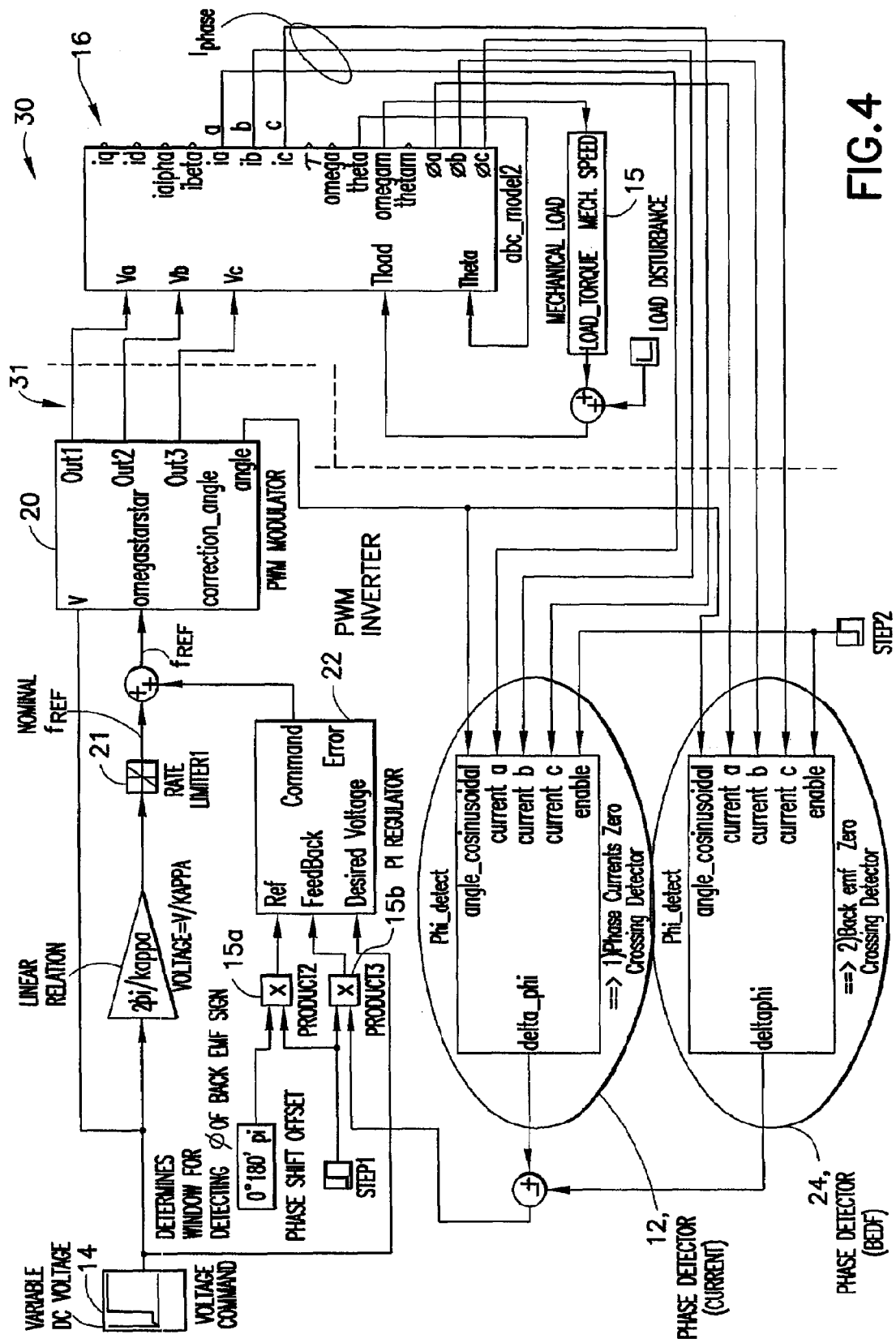
FIG. 4 is a diagram of a circuit of an embodiment of the present invention that optimizing a power transferred from an inverter circuit to a motor using the sign of the back EMF of the motor's phase.

FIG. 4 illustrates a control circuit 30 that optimizes the power transferred from an inverter circuit 31 to the motor 16 having the load 15. The inverter circuit 31 includes a first phase detector circuit 12 for sensing the sign of a motor phase current and a second phase detector circuit 24 for sensing the sign of the back EMF of the motor phase. Both circuits 12 and 24 are used to control the Brushless Permanent Magnet Motor 16.

A variable DC voltage or reference command 14 is provided from outside of the circuit 30 to start the motor 16. An open loop method is used to start-up the motor 16 and have it reach a minimum speed. The sign of the current of the motor's phases $I_{PHASE}$ and the sign of the back EMF can be detected by the first and second phase detector circuits 12 and 24.

As discussed above with reference to FIG. 2, the sign of the phase currents is used to detect the zero crossing of the current per each phase. The sign of the phase back EMF is used to detect the zero crossing of the back EMF per each phase. The sign of the phase back EMF is determined using the same principle as in FIG. 2.

The zero crossing of the phase currents and the zero crossing of the phase back EMF are used to obtain a phase shift between phase current and back EMF. The same method as discussed above is used to obtain both phase shifts. The phase shift is defined as a difference between detected phase of each current and detected phase of each phase back EMF.

An initial frequency reference for closed loop operation is obtained with the same method as in startup mode. The regulator circuit 22 uses the error between a desired phase shift, i.e., coming from a phase shift offset internal reference, and a measured phase shift, i.e., coming from a phase detector circuits 12 and 24, to change the frequency reference of the modulator 20 to adjust it for every working condition in the closed loop.

Figure 5:
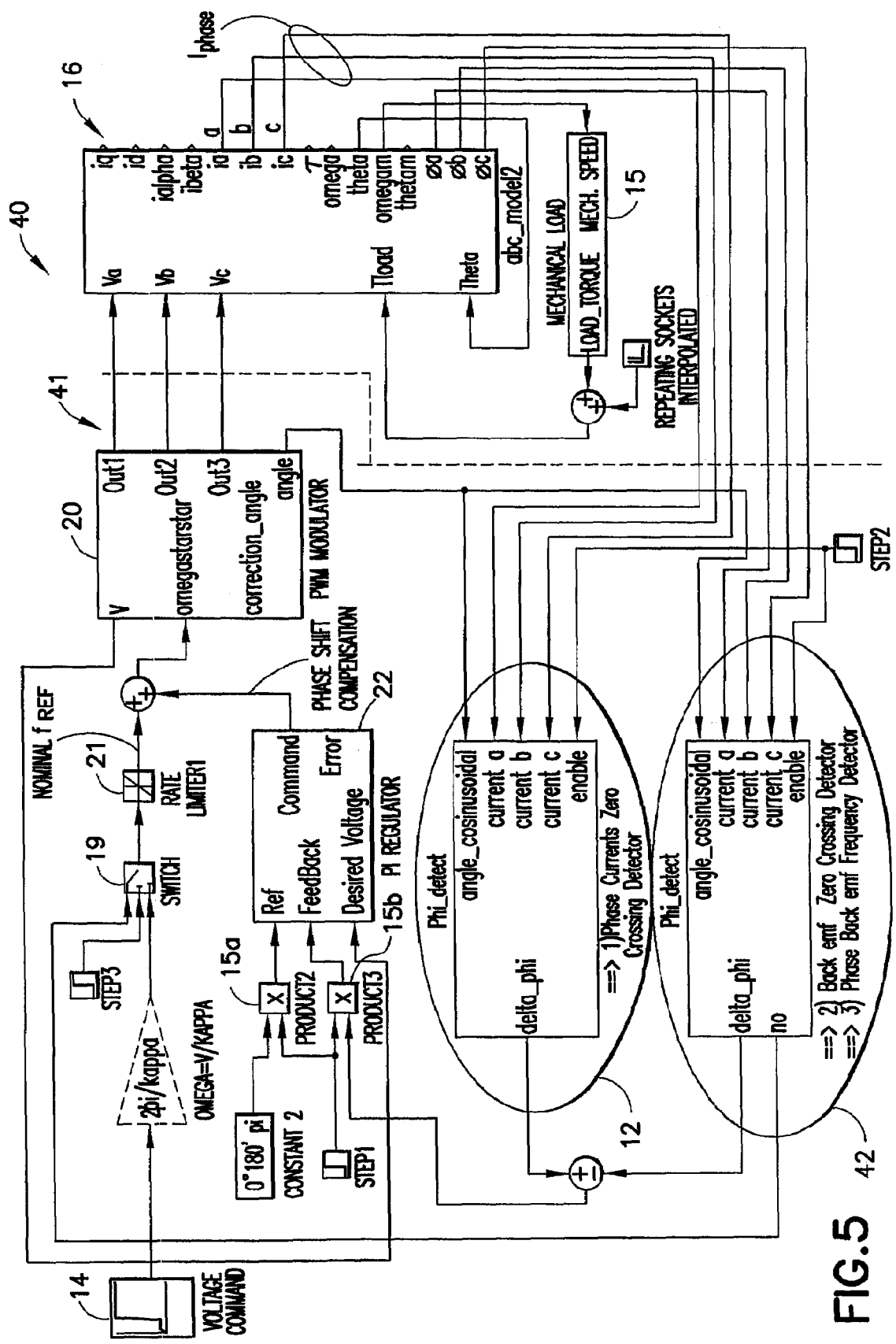
FIG. 5 is a diagram of a circuit of an embodiment of the present invention that optimizing a power transferred from an inverter circuit to a motor using the frequency of the back EMF extracted from the sign of the back EMF of the motor's phase.

FIG. 5 illustrates a control circuit 40 that optimizes the power transferred from an inverter circuit 41 to the motor 16 having the load 15. The inverter circuit 41 includes a first phase detector circuit 12 for sensing the sign of a motor phase current and a second phase detector circuit 42 for sensing the sign of the back EMF of the motor phase and for extracting the frequency of the back EMF from the sign of the back EMF. The circuits 12 and 42 are used to control the Brushless Permanent Magnet Motor 16.

A variable DC voltage or reference command 14 is provided from outside of the circuit 40 to start the motor 16. An open loop method is used to start-up the motor 16 and have it reach a minimum speed. The sign of the current of the motor's phases $I_{PHASE}$, the sign of the back EMF, and the frequency of the back EMF extracted from the sign of the back EMF can be detected by the first and second phase detector circuits 12 and 42. The extracted frequency of the back EMF is provided to the modulator 20 through the switch 19 and the rate limiter 21.

Figure 6:
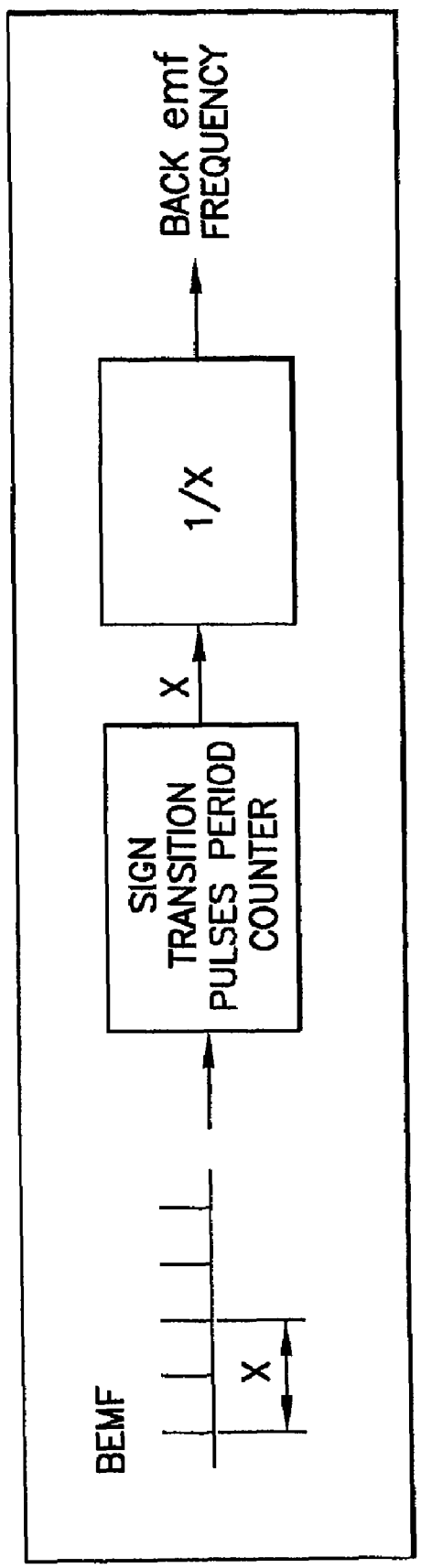
FIG. 6 is an illustration of a progression of the use of the zero crossing of the back EMF in extracting the frequency of the back EMF.

As discussed above, the sign of the phase currents is used to detect the zero crossing of the current per each phase. The sign of the phase back EMF is used to detect the zero crossing of the back EMF per each phase. The zero crossing of the phase currents and the zero crossing of the phase back EMF are used to obtain the phase shift between phase current and back EMF. The phase shift is defined as a difference between a detected phase of each current and detected phase of each phase back EMF. Further, as illustrated in FIG. 6, the zero crossing of the back EMF is used to extract the frequency of the back EMF. The frequency of the back EMF is the frequency of the rotor.

In a closed loop the frequency reference is obtained from the phase detector circuit 42 measuring the frequency of the detected zero crossings back EMF transitions. An error between a desired phase shift, i.e., coming from phase shift offset internal reference, and a measured phase shift, i.e., coming from a phase detector circuit, is used to change the modulator frequency reference with a regulator circuit 22 and to adjust it for every dynamic change during working condition in the closed loop.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for optimizing power transferred from an inverter circuit to a motor, the circuit using an open loop method to start-up the motor and have it reach a minimum speed, each phase of the motor receiving voltage from the inverter circuit, the circuit comprising:
    at least one phase detector circuit for sensing the sign of one or more currents, the sign of the current being used to detect a zero crossing of the current;
    an interpolator for receiving a voltage reference and outputting a frequency reference and a phase shift reference, the phase shift reference being a difference between an imposed voltage modulation and the one or more currents; and
    a regulator circuit for using an error between the phase shift reference and the sign of the one or more currents to calculate a phase shift compensation,
    wherein the sign of the one or more currents is determined to be positive at first sign transition instances when a sinusoidal wave of the current crosses to a positive area and to be negative at second sign transition instances when a sinusoidal wave of the current crosses to a negative area, the first and second sign transition instances being used to detect a phase shift of the current versus the imposed voltage modulation.

2. The circuit of claim 1, further comprising a circuit for determining a window of time for measuring the sign of the one or more currents and at least one multiplier circuit.

3. The circuit of claim 1, wherein the one or more currents comprises a current of each phase of the motor and the phase shift is a difference between voltage modulation imposed on each phase of the motor and the current of each phase of the motor.

4. The circuit of claim 2, wherein the one or more currents comprises a back EMF current of each phase of the motor and phase shift is a difference between the current of each phase of the motor and the back EMF current of said each phase of the motor.

5. The circuit of claim 4, wherein the at least one phase detector circuit sensing the back EMF current further extracts a frequency of the back EMF current from the sign of the back EMF current, the frequency of the back EMF being the frequency of a motor rotor.

6. The circuit of claim 5, wherein the frequency of the back EMF current is achieved by counting the first and second sign transition instances to create a first count and inverting the first count.

7. The circuit of claim 1, wherein the frequency and phase shift references are being used for regime condition at every speed value of the motor.

8. The circuit of claim 1, wherein the motor is a Brushless Permanent Magnet Motor.

9. The circuit of claim 1, further comprising:
    an external source for providing a voltage reference for starting the motor;
    a linear relation circuit and a rate limiter for receiving the voltage reference and providing a normative frequency;
    a circuit for providing a compensation signal by combining the normative frequency and the phase shift compensation; and
    a PWM modulator circuit for receiving the compensation signal and changing frequency of voltage modulation to adjust said frequency for every working condition in a closed loop.

10. The circuit of claim 9, further comprising a first switch connected between the linear relation circuit and the rate limiter.

* * * * *